(12) United States Patent
Hendrix

(10) Patent No.: US 8,566,222 B2
(45) Date of Patent: Oct. 22, 2013

(54) PLATFORM FOR VALUATION OF FINANCIAL INSTRUMENTS

(75) Inventor: Derrell J. Hendrix, East Molesey (GB)

(73) Assignee: RISConsulting Group LLC, The, Boston, MA (US)

( * ) Notice: Subject to any disclaimer, the term of this patent is extended or adjusted under 35 U.S.C. 154(b) by 0 days.

(21) Appl. No.: 13/330,756

(22) Filed: Dec. 20, 2011

(65) Prior Publication Data

US 2012/0185410 A1  Jul. 19, 2012

Related U.S. Application Data

(60) Provisional application No. 61/425,018, filed on Dec. 20, 2010.

(51) Int. Cl.
*G06Q 40/00* (2012.01)

(52) U.S. Cl.
USPC .......................................................... 705/37

(58) Field of Classification Search
USPC ............................................................ 705/36
See application file for complete search history.

(56) References Cited

U.S. PATENT DOCUMENTS

| | | | |
|---|---|---|---|
| 8,160,977 B2 | 4/2012 | Poulin | |
| 2008/0243721 A1* | 10/2008 | Joao | 705/36 R |
| 2010/0257117 A1* | 10/2010 | Shvadron et al. | 705/36 R |
| 2011/0184884 A1* | 7/2011 | Lyons et al. | 705/36 R |

* cited by examiner

*Primary Examiner* — Jessica Lemieux
(74) *Attorney, Agent, or Firm* — Fish & Richardson P.C.

(57) ABSTRACT

A machine-based method includes recording, by one or more computers, a first model for use in valuing a financial instrument in a financial market, publishing by the one or more computers the first model to systems of a group of users, receiving by the one or more computers review information pertaining to the first model resulting from publishing the first model and recording, at the one or more computers, a second model derived from the first model based on received review information and the associated data.

48 Claims, 6 Drawing Sheets

FIG. 5

PLATFORM FOR VALUATION OF FINANCIAL INSTRUMENTS

This application claims priority under 35 U.S.C. §119 to U.S. Provisional Patent Application Ser. No. 61/425,018, filed Dec. 20, 2010, and entitled "Valuation in a Financial Market," the entire contents of which are hereby incorporated by reference.

BACKGROUND

This description relates to valuation in a financial market, and more particularly to assessing the risks associated with and valuation of various business entities, assets, transactions, and financial instruments in the marketplace.

In a marketplace, stakeholders, such as banks, insurers, private and institutional investors, regulators, or governments often make financial or business decisions based on assessed risks or valuations of an investment. For example, a stakeholder may invest to obtain a regular (or fixed) return by lending money to a borrower or purchasing a financial instrument, where the borrower or financial instrument pays interest once a month. Financially, the stakeholder has been issued a fixed-income security. Typical risks associated with such a fixed-income security may include 1) the borrower's inability to pay the principal back or inability to pay the promised interest, or 2) the inability of the assets underlying a financial instrument to generate sufficient cash flow to pay the principal back or inability to pay the promised interest. The stakeholder would want to assess such risks before investing and periodically determine whether the value or risk has changed from the time of the initial valuation.

Generally, financial intermediaries and rating agencies assess risks associated with complex financial instruments, and as a consequence, rating agencies, assign a rating to such financial instruments. For example, rating agencies typically use various, proprietary and unpublished algorithms to rate securities for pricing, measuring the value, assessing volatility, and accessing risks associated with the securities or other financial instruments. Different agencies may rate the same financial instrument differently and provide the stakeholders with inconsistent conclusions regarding the security of that financial instrument.

SUMMARY

In one aspect, the description features a machine-based method. The method includes recording, by one or more computers, a first model for use in valuing a financial instrument in a financial market; publishing by the one or more computers the first model to systems of a group of users; receiving by the one or more computers review information pertaining to the first model resulting from publishing the first model; and recording, at the one or more computers, a second model derived from the first model based on received review information and the associated data.

In another aspect, the description features a computer program product residing on a computer readable medium. The computer program product comprises instructions for causing a processor to: record, by one or more computers, a first model for use in valuing a financial instrument in a financial market; publish, by the one or more computers, the first model to systems of a group of users; receive, by the one or more computers, review information pertaining to the first model resulting from publishing the first model; and record, at the one or more computers, a second model derived from the first model based on received review information and the associated data.

In another aspect, the description features a computer system comprising a processor, a memory, and a storage device. The storage device stores a program for execution by the processor using the memory. The program comprises instructions configured to cause the processor to: record, by one or more computers, a first model for use in valuing a financial instrument in a financial market; publish, by the one or more computers, the first model to systems of a group of users; receive, by the one or more computers, review information pertaining to the first model resulting from publishing the first model; and record, at the one or more computers, a second model derived from the first model based on received review information and the associated data.

Implementations of the method, the computer program product, and/or the computer system may include one or more of the following features. The second model is used in assessing a financial instrument in the financial market. Data associated with the financial instrument and the first model is recorded at the one or more computers. Valuation of the financial instrument is with respect to at least one of pricing, assessing volatility, and accessing risks associated with the financial instrument. Inputs are received by a wiki-based computer system from the group of users to produce by the wiki-based computer system the second model. A request for valuing a financial instrument and valuing the financial instrument based on the second model is received. The second model is modified based on the received request and using the modified second model to rate the financial instrument. The group of users is enabled to access information contained in the received request and to modify the second model. A requester of the request for valuing the financial instrument is enabled to review the second model and the modification made to the second model. Valuation results of the financial instrument are delivered to the requester. Information related to the valuation results and the modified second model is delivered to previous requesters who requested valuations of financial instruments having features similar to the financial instrument. The second model comprises a stochastic model. A set of second models including the second model derived from the first model is recorded, each model in the set of second models being used for valuing financial instruments. The models in the second set of models are categorized into different model types based one or more of description of financial instruments, contracts associated with the financial instruments, interpretation of legal documentation, appropriate structure of cash flows, seniority and subordination of tranches, rights to recoveries, the risk drivers and risk mitigants, and the stochastic properties of the risk drivers. When a request for valuing a financial instrument is received, the type of second model to be used for valuing the financial instrument is determined.

The description provides one or more of the following advantages. A platform on a shared network provides a venue supporting liquidity in the financial marketplace, e.g., the fixed income securities (FIS) market. The platform acts as an integrator of data, securities details (e.g., cash flows and waterfall information specifying the priority of payments) and analytical approaches (e.g., Gaussian copula) to provide integral and consistent risk assessment and valuation. The platform and its associated system can provide an independent modeling capability that leverages contributions made to models by entities in the marketplace including professionals and experts in the marketplace. The platform and the system enable value and risk benchmarking for individual securities and bank FIS portfolios. Analysis and valuation of a financial instrument or an asset can be conducted and delivered to customers on a continuous basis. The platform and the system can also improve the transparency of financial institutions that invest in various financial instruments.

Other features, objects, and advantages will be apparent from the description and drawings, and from the claims.

DETAILED DESCRIPTION

Figure 1:
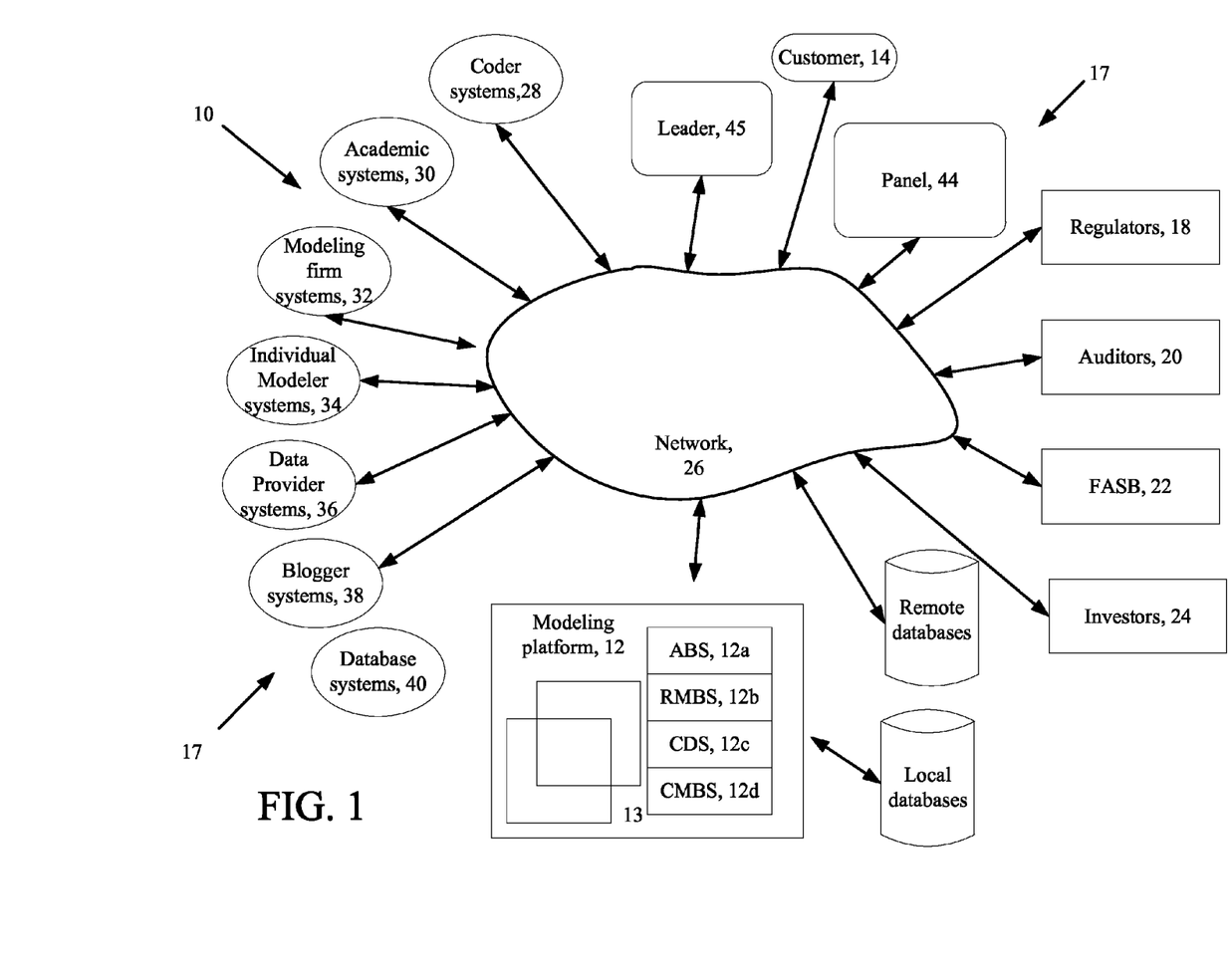
FIG. 1 is a block diagram of a valuation system.

Referring to FIG. 1, a valuation system 10 includes a modeling platform 12 including one or more computer systems 13 that are coupled to client or other systems generally labeled as 17 and specifically in this example, systems 14, 18, 20, 22, 24 28, 30, 32, 34, 36, 38, that are representative of some of the types of participants involved with the valuation system 10 to provide network-based, consistent and reliable valuations of various financial instruments to customers, e.g., customer 14, or stakeholders 16 (e.g., regulators 18, auditors 20, the Financial Accounting Standard Board (FASB) 22, or investors 24). The one or more computer systems build/execute models for modeling one or more practice areas dedicated to the valuation of specific various financial instruments (e.g., for risk assessment and valuation in the asset-backed-security (ABS) practice, the residential-mortgage-backed-security (RMBS) practice, Commercial mortgage-backed securities (CMBS), and credit default swap (CDS) practice, respectively). In the platform 12, the different practice areas are labeled as various constituent sub-platforms, e.g., ABS practice sub-platform 12a, RMBS practice sub-platform 12b, and CDS practice sub-platform 12c and CMBS practice platform 12d. There can be other constituent sub-platforms.

In the remote and/or local storage systems associated with the system 13 are stored various and, in instances numerous, open valuation models that assess risk or calculate valuations of financial instruments based on various modeling scenarios. The models stored and usable by the clients or stakeholders 16 are those models that have been accepted by a community associated with the platform 12 and the system 10, as discussed in further detail below.

In particular, the valuation system 10 allows community users of the platform 12 to access the system 10, to share knowledge, and to establish and update models for valuating financial instruments via the network 26 and the modeling platform 12 in response to customers' requests. The community users, e.g., exemplarily represented by client systems 18, 20, 22, 24, 28, 30, 32, 34, 36, 38, 44, 45, can include professionals in various disciplines that will design and validate the models as discussed in detail below.

The models are produced and regularly updated by the platform 12 based on results of the valuation processes and continuous input from the community users. The platform 12 provides valuations, e.g., based on one or more sets of specifications for the financial instruments to be evaluated.

One implementation of the platform 12 uses wiki server software that allows the community users or the customers to freely produce and edit web page content through a web browser using a markup language or a text editor. In this use of a wiki server, web pages are used in connection with development of appropriate modeling approaches to obtain actual valuation models. A wiki-based platform implementation offers modeling capabilities to market participants, such as customers, while enhancing the modeling capabilities through the participation of all community users. The wiki-based platform supports web-based collaboration and accommodates a seamless integration of updated data and assumptions that enable the refreshing of the model on a continuous basis as market conditions change. For example, after a certain period of time, the stored, final model can be reposted on the platform 12 for new modification and verification in a changed market condition. Other web-based and non-web-based technologies can also be used for implementing the platform 12.

As an example of using the system 10, a customer 14, e.g., a bank that plans to issue or invest in a financial instrument or that already holds a financial instrument in its portfolio communicates with the platform 12 through the network connection 26 to cause the system 10 to assess risk associated with the financial instrument and to estimate its value. The system 10 evaluates the financial instrument by developing a new model or by using one or more of the models that have been accepted by and are transparent to the community users (e.g., the customers or stakeholders 16 and/or others) of the system 10 through the network 26.

As another example of using the system 10, for a particular financial instrument, the system 10 provides an initial model and may solicit input from community users, e.g., registered users such as software model coders using coding systems 28, professors using academic systems 30, individual modelers using individual modeler systems 34, modeling firms using modeling firm systems 32, data providers using data provide systems 36, bloggers using blogger systems 38, database managers, and others, to verify one or more aspects of the model. (For simplicity, we also use coders 28, professors 30, individual modeler 34, modeling firms 32, data providers 36, and bloggers 38.) The platform 12 can also be linked to academic resources. In some implementations, authorized community users, e.g., authorized based on credentials or eligibilities, can access the code of the initial model and make modifications, subject to agreement of the hierarchy of community users, or to comment on the initial model through the platform 12. The system 10 can implement various levels of security requirements on the users, e.g., by requiring the users to register and controlling their access to certain parts of the network 26 and the modeling platform.

In some implementations, a leader, at a leader system 45 is designated to evaluate and rate the contributions of the modelers or other authorized community users towards to development and completion of models. The system 10 enables the leader at system 45 (leader 45) to manage the model specification and development process. For example, the leader 45 can have a prioritized access right to the system 10 that enables the leader 45 to interact with the customer 14 and other community users. The leader 45 will be an expert in a given financial based practice, e.g., asset-backed securities, residential/commercial mortgage-backed securities or derivatives (see FIG. 1). The leader 45 can initiate and police the model specification and building process, e.g., authorizing users and preventing frivolous or damaging comments and modifications to the model code. In one example, the leader 45 can act as a moderator that ensures the contributions from the users are relevant, accurate, relevant to the topic of the model, as well as grounded in current academic research and the current thinking of regulators and key market participants. The leader 45 can also facilitate the process in determining the final model which will be submitted to a panel 44 for ultimate review and approval.

Based on the input of all participants, the leader 45 designates one of the models developed as a final model. The final model, chosen by the leader 45 or accepted by the community, can be stored and used for performing valuation or risk assessment for the customer 14 or for the development of subsequent models which will have a similar specification.

In some implementations, the final models are not implemented until a panel of advisors 44 review and approve the final models produced in the community. For example, the leader 45 can send the review request to the panel 44 after the leader 45 chooses the final model. The panel 44 will include subject matter experts who will review the code of all models and review the process under which the model was built in the community. The panel 44 can be a rotating panel. For example, different market professionals can serve as the members of the panel 44 for a predetermined length of time. The panel 44 can also review other models at the platform 12.

Depending on the model and assumptions used in the model, an assessed value determined by such a model for a financial instrument may exceed (or be less than) the current fair value (if available) in the marketplace for the financial instrument, since the market does not necessarily determine values of financial instruments based on analytics that are evaluated by the models, but instead based on current supply/demand for the security in the market. The system 10 provides valuations of financial instruments at a large scale in a consistent and repeatable manner.

The valuation process implemented at the platform 12 is visible to the customer at client systems 17 and the community users. Such transparency of the valuation process builds trust in all users in the marketplace in the value of various securities, e.g., the structured finance and other credit securities (including collateralized debit obligations and credit derivatives contracts, fixed income securities, U.S. residential mortgage security (RMBS) and others). The participation of the various community users in the process of building risk assessment and valuation models, and the verification or modification of such work product produce a generally accepted and collaborative basis for risk valuation with transparency which will encourage marketability by having accepted valuations. The system 10 provides an open, peer-reviewed collaboration that enables sharing of data, models, methodologies and high-level results to produce a generally accepted, independent source of valuations in the financial marketplace.

Valuation services are provided to customers of the system 10 at a relatively low cost, even when the customer has a large portfolio for valuation. Data contributed by the participants, such as market data, models codes and model output (but not the customers' proprietary information) may be shared with other market participants, e.g., for free or for a fee. For example, one or more segments of the fixed income securities (FIS) market (e.g., issuers, investors, underwriters and regulators) in a collaborative environment can pool and store data, build and deploy models, perform analysis and share results through the platform 12.

In some implementations, the cluster of constituent sub-platforms 12a, 12b, 12c, 12d (e.g., implemented as constituent wikis) of the platform 12 (e.g., implemented as a wiki-based platform) each focuses on particular elements of the system 10. For example, each constituent sub-platform is organized by a topic, which can include, for example, the description of financial instruments or contracts, the interpretation of legal documentation and the appropriate structure of cash flows, the seniority and subordination of tranches and rights to recoveries, the risk drivers and risk mitigants, the stochastic properties of the risk drivers, and others. The topics may also include questions regarding the appropriateness of deterministic versus stochastic models and appropriate stress levels. The constituent sub-platforms include servers to store and execute codes with a storage protocol (e.g., by instrument or by portfolio) determined by the respective sub-platforms. The stored codes can be used for the valuation program. For example, the code can specify which model input data is to be selected from a database to run the model, the steps in the calculation process, and the calculations required to estimate a distribution of potential values for a security.

Users of the platform 12 having different specialties can participate in model development, modification, and verification in one or more different practices through interaction with one or more constituent sub-platforms. Each user can join one or more of the sub-platforms. The users can freely change their participations in different sub-platforms. In some implementations, users of a particular sub-platform are accepted into a sub-platform by a leader 45 of the sub-platform (further discussed below). In some implementations, a user is authenticated once when accessing the platform 12 and can access any of the sub-platforms 12a-12d without additional authentication. In other implementations, one or more sub-platforms 12a-12d requires independent user authentication for access.

The constituent sub-platforms can be regulated by a rotating panel, like the panel 44 regulating the platform 12, to protect the data quality associated with each sub-platform. The data can include, e.g., legal documents, economic data, market data, underlying loan pool data, cash flow data, or other data. In some implementations, each sub-platform is moderated by a member of the panel or a subject matter expert approved by the panel, e.g., the leader 45. The control implemented by the system 10 and the panel 44 or the rotating panel for the sub-platforms can protect the system 10 or the platform 12 against bogus inputs to model algorithms/codes and corruption of output, audit trails on all changes made to each particular model algorithm/code, e.g., by whom and when. The ongoing quality of the sub-platform dynamic or platform dynamic can be ensured. In some implementations, the inputs and transmissions of the inputs/outputs of the system 10 or platform 12 are encrypted. All participants of the system 10 are authenticated.

Figure 2:
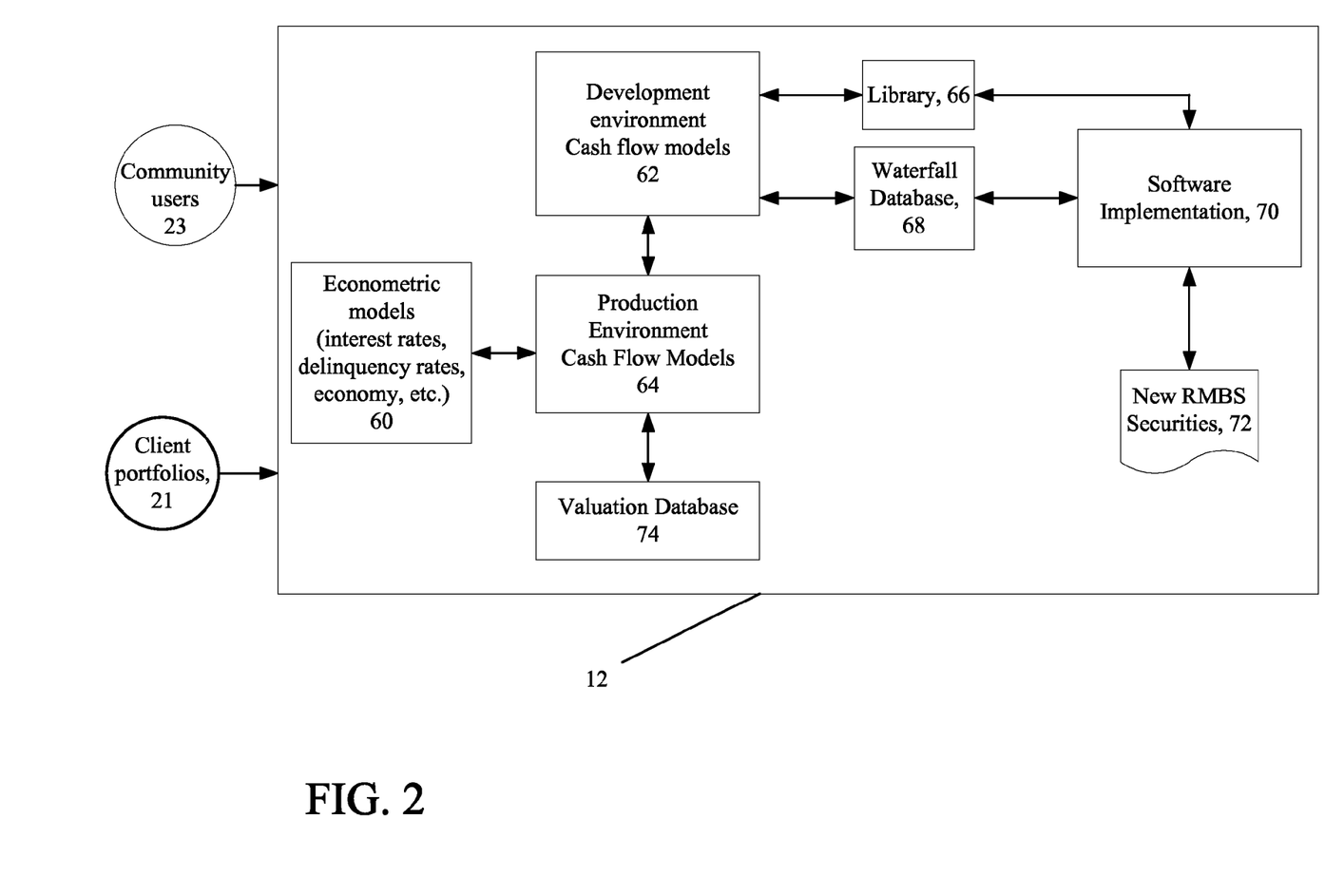
FIG. 2 is a block diagram of a part of a valuation system.

Referring also to FIG. 2, a logical view of the platform 12 is shown. The customer 14 at client systems 17 and/or other community users 23 at respective client systems interact with the platform 12 (and the system 10) through user interfaces displayable on their respective computer systems (or other devices). The community users in general use computers to access the platform 12 over the network 26, which can be global or limited to a particular marketplace that is regulated by a particular set of financial rules or law.

Upon receiving information from the client systems 17, the platform 12 executes various functions to satisfy service requests from the customer 14, e.g., a request to value a portfolio 21 or to react to input from the community users 23. The one or more computers 13 of the platform 12 generate, store, and update econometric models 60. The econometric models are generated based on input to the platform 12 from the community users 23, and in some instances the customer 14.

In particular, the platform 12 includes software to provide a model development environment 62 that interacts with a model production environment 64. The model development environment 62 allows the community users 23 and the customer 14 to access codes of the models, e.g., cash flow models, to develop and update the models. In some implementations, the community users 23 and the customer 14 are allowed to access other parts, e.g., various databases, of the platform 12. The access can be strictly controlled to provide security and different users/customers can be authorized to have different accessibility.

The data used in developing the models include input from the customer 14 and data stored in library 66, waterfall database 68, and/or valuation database 74. The library 66 and the waterfall database 68 are structured to interact with software implementations 70 that provide insights to the models to be built based on the data in the databases and/or data input by the customer 14. In the example shown in FIG. 2, the models to be built are for residential-mortgage-backed-security (RMBS) 72, e.g., as requested by the customer 14, and the software implementations enable an understanding of the structure for one or more RMBS. The model development environment 62 takes the structure of the underlying mortgages into account in building the models for valuing the RMBS. The platform 12 also includes other types of software 70 for use with other types of financial instruments. The platform 12 is structured to be compatible with one or more computer programs or codes, e.g., Matlab, SAS, or Python. In some cases, new models for RMBS or other fixed income securities will be developed in 62 without use of 66 or 70.

The platform 12 allows open, peer-reviewed and collaborative sharing of models for use in the financial marketplace. The platform can allow data review and manipulation, statistical analysis (e.g., risk factor regressions), model specification, model building, model estimation, and model testing and validation. Through the valuation process at the platform, generally accepted methodologies for risk assessment and valuation can be generated and used, helping to build trust in the financial marketplace. Sharing, e.g., use of the generally accepted (or standardized) models, can reduce the risks and costs of all community users. Customers gain a competitive advantage through reduced cost of funds and increased valuation of securities held at a fair value that is accepted by confident stakeholders.

The control of system 10 is performed by execution of software residing on the computers or computer systems of platform 12. For example, the formats for the interchange of data and models can be published at the platform 12 and distributed through shared directories.

Figure 3:
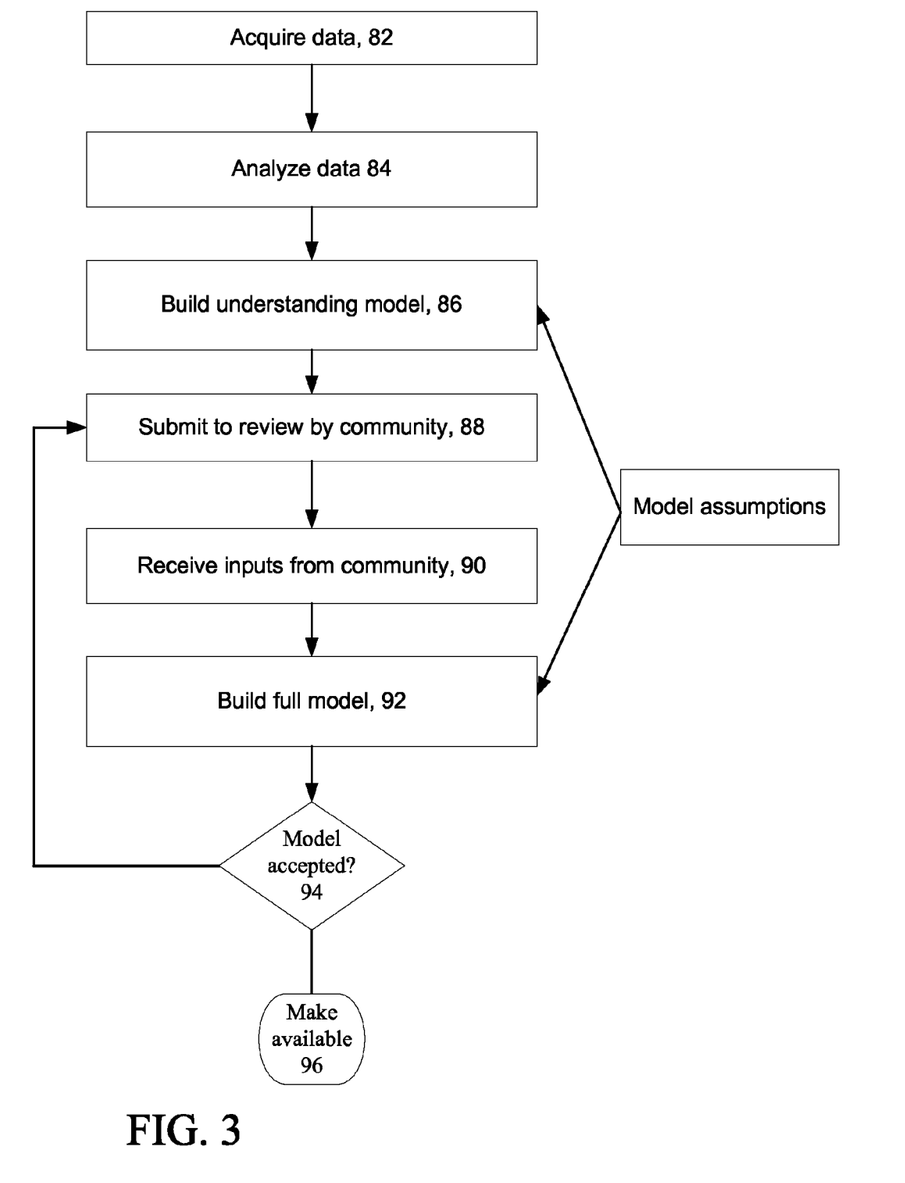
FIG. 3 is a flow diagram of a model generation process implemented by a valuation system.

Referring further to FIG. 3, models for use in valuation processes at the system 10 can be generated during or before a valuation process. The platform 12 acquires 82 data from the customer 14 or from other sources, which can include loan-level data, collateral details, delinquency and default rate data, and/or macroeconomic data. The platform 12 analyzes 84 the data acquired from the customer by, e.g., identifying cash flows, assessing capital structures, and determining waterfall structures. The platform 12 allows community users to build 86 understanding models to share with the customer 14 to confirm the analysis of the cash flows, the capital structures, and the waterfall structures. In some implementations, the platform 12 automatically builds 86 the understanding models. The understanding model is submitted 88 to the community users for review. The platform 12 receives 90 input from the community on the models, based on which full stochastic models are built 92 for estimating a range of potential future value outcomes that reflect the probability of a range of valuations. In some implementations, in building the understanding models and the full models, model assumptions are taken by the platform 12. The generated full stochastic models can be submitted to a panel 44 (FIG. 1) for final review. The panel 44 can decide 94 whether to accept the full stochastic models for use at the platform. If the models are not accepted, the platform 12 may generate new understanding models and restart the process of generating the full stochastic models. In some implementations, the panel 44 can provide modifications to the rejected full stochastic models and the modified models can be submitted to the community for review. If the models are accepted, the platform 12 makes the full model available, 96 for customer use.

In some implementations, the customer 14 or other third parties can provide an initial model and request the model be peer-reviewed by the community users of the system 10. In some implementations, the system 10 can build customer-specific models upon request and the community users can further verify or modify the customer-specific model to obtain a final model. The verified final model can be applied to all modeling projects in the same area, e.g., the RMBS market. The final model can also be further adjusted for each specific modeling project based on particular information related to the specific modeling project.

Figure 4:
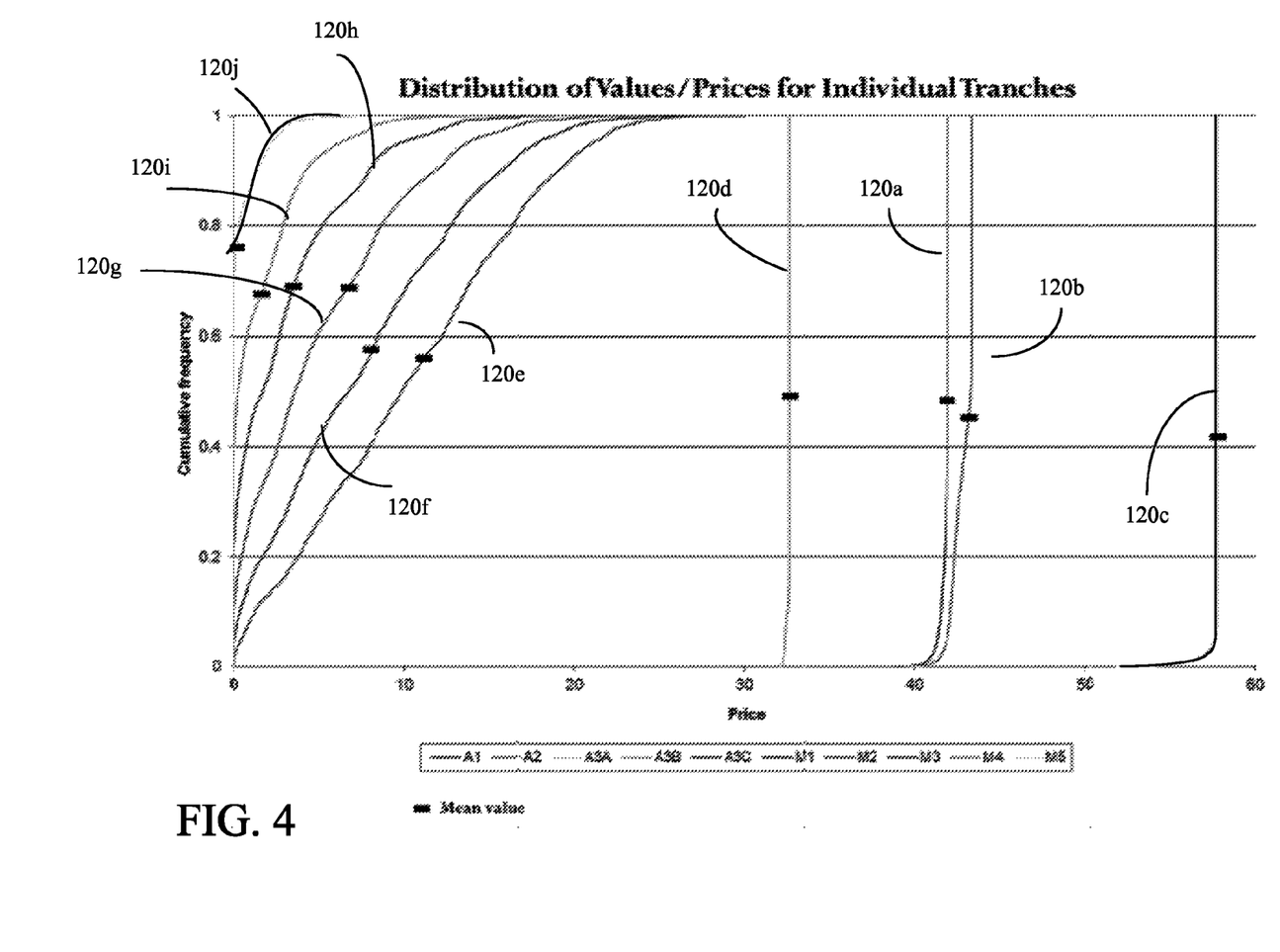
FIG. 4 is a plot of stochastic valuation output.

Referring to FIG. 4, an example of typical stochastic valuation output 120 is shown via curves 120a-120j for a portfolio having 10 tranches depicted for illustrative purposes. The stochastic valuation process is based on the generated stochastic models by the platform 12 provides the customer with a distribution of likely value outcomes for each tranche of a specified transaction. Such a distribution also highlights potential price volatility. In FIG. 4, cumulative frequency is plotted vs. price for depicting a distribution of values/prices for individual tranches, with the mean value indicated by the bar in each line of each tranche. In the exemplary plot there are two tranche classes A and M, with each tranche class have sub-tranches.

In addition to independent valuations of financial instruments, such as securities, the customer's interaction with the platform 12 and the system 10 also allows the system 10 to provide the customer with at least the following benefits: maintaining the customers' portfolio information with maximum safeguards to privacy and security, allowing the customers to save and track their portfolios, allowing the customers to upload portfolios, view valuation results online and/or through standard reports, allowing the customers to access full data transparency of their securities and peer review for comparison to like securities for analysis purposes, and others. In addition, upon request, the system 10 can conceal the identity of the customers submitting the requests from the community users. The system 10 is also configured to provide advanced features, such as specialized valuation scenarios, e.g., multiple versions of a given model, multiple versions of model valuations based on different underlying assumptions.

In the implementations when the platform 12 includes constituent sub-platforms (e.g., 12a-12d of FIG. 1), the model generation process described above can be implemented independently on each sub-platform. A large number of models can be reviewed, modified, and accepted through the platform 12 at the same time. Different community users who are specialized in different types of modeling can work on the various types of models. All market participants may use the system 10 to collaborate to contribute data, model development, and the design that determine the desired model outputs.

The process of generating the models is explained in further detail. In some implementations, the system 10 provides the understanding model generated based on initial input data and information related to the financial instrument to be valued, e.g., security cash flow, waterfall and collateral information, collected from the marketplace, collaborators, or from the customer 14. The system 10 develops the understanding model as the basis for the development of a stochastic risk measurement and valuation model developed in the platform 12. The authorized community users develop such valuation model, e.g., a stochastic model that is suitable for use based on the particular customer model input and the understanding model.

In some implementations, the system 10 automatically generates a benchmark model based on the customer's input and the understanding model. The community users further develop the valuation model based on the benchmark model. The models, e.g., the understanding model, the benchmark model, and the valuation model, can be modular and scalable.

During model generation, the community users may have access to some of the customer's confidential information contained within the customer model input. The platform 12 can request the community users to sign a confidentiality agreement before authorizing the community users to access the platform and/or confidential information. The model generated can be specific to each customer's request for valuation. In some implementations, the platform 12 can also categorize the models generated for different customer requests, e.g., based on the type of financial instruments valuated. The platform 12 can further use the categorized models in future customer requests for valuation.

For the modeling environment to evaluate the risk, e.g., for an unimpaired investment, a present value matrix is generated for each certificate (which is a particular security within a securitization) for various, generally equally weighted scenarios. For example, the stochastic model built at the platform 12 uses Monte Carlo simulation techniques to generate multiple scenarios to, e.g., determine the range of valuation outcomes and the distribution of valuation outcomes in those scenarios. Other types of modeling algorithms can be used.

As an example, Table 1 shows a present value matrix generated from the outcomes of the stochastic models. "T" represents a duration of time, which can be a month, a year, and etc. In the example that T is a year, T=0 is the present time, T=1 is one year away from the present, T=2 is two years away from the present, and so on.

TABLE 1

| Present value of certificate I | T = 1 | T = 2 | ... | T = N |
|---|---|---|---|---|
| Scenario 1 | | | | |
| Scenario 2 | | | | |
| ... | | | | |
| Scenario M | | | | |

The model connects the various risk drivers (e.g., credit risk, pre-payment risk and interest risk).

Table 2 shows a range of valuations for multiple tranches of a securitization transaction in present value terms for the evaluation date for an exemplary securitization (i.e., unimpaired certificates). Similar distributions may be generated for other dates. Statistics such as mean, minimum, percentiles (Value-at-Risk) may be generated, where A1 to M5 are different securities, e.g., arranged based on seniority within an overall offering.

TABLE 2

| | Market Price | Mean | Min | 0.1% | 1.0% | 5.0% | 95.0% | 99.0% | 99.9% | Max |
|---|---|---|---|---|---|---|---|---|---|---|
| A1 | 42-07 | 41.79 | 39.03 | 39.80 | 40.72 | 41.31 | 41.90 | 41.90 | 41.90 | 41.90 |
| A2 | 39-06 | 42.93 | 39.40 | 40.21 | 41.24 | 41.88 | 43.37 | 43.37 | 43.37 | 43.37 |
| A3A | 56-12 | 57.71 | 51.89 | 54.00 | 56.27 | 57.61 | 57.76 | 57.76 | 57.76 | 57.76 |
| A3B | 32-03 | 32.58 | 32.12 | 32.14 | 32.24 | 32.34 | 32.61 | 32.61 | 32.61 | 32.61 |
| A3C | 31-10 | 10.14 | 0.00 | 0.00 | 0.04 | 0.47 | 20.99 | 23.88 | 26.81 | 30.03 |
| M1 | n.a. | 7.42 | 0.00 | 0.00 | 0.00 | 0.05 | 17.81 | 21.26 | 24.85 | 26.05 |
| M2 | n.a. | 4.83 | 0.00 | 0.00 | 0.00 | 0.00 | 13.64 | 17.53 | 21.75 | 23.15 |
| M3 | n.a. | 2.83 | 0.00 | 0.00 | 0.00 | 0.00 | 9.65 | 13.44 | 17.04 | 18.81 |
| M4 | n.a. | 1.43 | 0.00 | 0.00 | 0.00 | 0.00 | 6.13 | 9.17 | 12.27 | 13.88 |
| M5 | n.a. | 0.34 | 0.00 | 0.00 | 0.00 | 0.00 | 2.18 | 3.51 | 6.34 | 7.27 |

In Table 2, for each specific financial instrument A1, A2, . . . , M5, modeled values are listed based on a given statistical measure, e.g., the mean value, the minimum value, and etc., as labeled in the uppermost row of the table. For example, the A3A instrument has a mean value of 57.71, a minimum value of 51.89, a maximum value of 57.76, and a value at the 1.0% interval of 54.00.

The computers or computer systems of the platform 12 store each version of the modified codes for a model being modified or verified. In some implementations, the various versions can be temporarily or permanently stored on remote or local storage systems (FIG. 1) connected to the platform 12. The community of users can accept or reject modifications made in various versions and can also continue modifying the codes based on an accepted modified version. The computers or computer systems can be hosting servers on which a secure platform is implemented.

A large number of models suitable for use in valuing different types of assets or asset classes can be generated, stored and updated through the system 10 for repeated use. In some implementations, the system 10 includes different segments such that financial instruments of different types or having different asset classes are valuated in different segments (discussed in detail below). Upon receipt of a request for valuing a financial instrument, the system 10 uses inputs provided by the customer 14 to select the initial model or finalize the model for valuation of the financial instrument, or to determine if a new model must be developed. Sample model inputs from the customer may include asset portfolio characteristics and or liability characteristics. Asset portfolio characteristics can include cash flow projections, definition of key risk drivers, historic data on projected and realized cash flows, underlying collateral details and others. Liability characteristics can include waterfall details, tranche size, repayment schedule, and others.

In response to the valuation request from the customer 14, based on the collaborative input of the community users, the system 10 can automatically provide the customer 14 with valuation results including, e.g., valuated intrinsic values of each financial instrument based on the net present value (NPV) of modeled future cash flows for each instrument, mean NPV, distribution of the modeled cash flows and valuations, and others. The customer 14 obtains the valuation of the financial instrument through this process. In some implementations, the system 10 can also automatically provide the customer with information associated with a distribution of the valuation, and/or multiple valuations based on one or more different model specification sets and/or assumption sets. Valuation of a financial instrument based on the customer 14's request can also be done periodically.

Valuation results are delivered to the customer 14 typically over the network 26 to the client systems 17, but can be delivered in other ways, e.g., by mail. In some implementations, the system 10 posts the valuation outputs periodically on a website associated with the system 10 or platform 12. Areas of the website can be configured to be accessible only by the customer, e.g., implementing an authentication process, or can be configured to be accessible by multiple authorized users.

The customer can actively participate in the valuation process with the platform 12 through client systems 17. In addition, the client systems 17 can access the details of the models applied to value the financial instrument, the views of the community users on the applied models and the valuation, and data used for building these models. The customer 14 may further choose to be informed of information regarding improvements and updates to the models. In some implementations, when one specific financial instrument, e.g., a specified CUSIP, is valuated, the results of the valuation are disclosed to all customers who requested valuation of the same financial instrument.

The system 10 processes valuation requests, similarly to the above examples, from various interested customers, including financial controllers who may be interested in valuations for illiquid securities in investment portfolios (e.g., hard to value or securities deemed to be illiquid such as Level II/III assets) and/or surveillance of trader marks relative to calculated intrinsic values; portfolio managers who may be interested in valuations to support buy, hold, and/or sell decisions; credit managers who need tools to support assessment of collateral securing loans and/or to help establish haircuts for lending or prime brokerage; risk managers who would like to have access to true value estimates, the ability to stress test valuations, and scenario analyses; and, regulators who need to supervise the banks based on unbiased valuations for bank portfolios and who can use another source of independent valuations to specify values for securities for discount windows purposes on a risk based basis thereby replacing or supplementing simplified "haircut" tables.

The accepted models at the platform 12 can be further improved. For example, through use of the accepted models, the system 10 acquires an expanded data store from customers through the client systems, such as banks and insurers, and an expanded knowledge base from other participants, such as regulators. While the system 10 uses the data provided by the customer systems and the accepted model to assess risks for each customer, the system 10 can also use the data to further perfect the models. The participation of other community users may allow the system 10 to be updated with changes in regulations and law, so that the accepted models can also be updated in conformity to the regulations and law. The system 10 or the platform 12 provide a human-powered system for valuing and risk assessing illiquid securities and related contracts (e.g., Credit Default Swaps). The involvement of more participants increases the transparency of the system 10 and the models used for the assessment, improves the processes of model verification and risk valuation, and builds trust in the valuation process.

Other market participants are invited to follow the platform 12. The larger number of the participants or followers, the greater the confidence in the process, the assumptions and the methods used for the risk assessment and valuation. In particular, certain governments or regulators may encourage assisted financial institutions to post models and certificates to the platform 12. The system 10 can be global in its contribution and its application, and can be developed on the principles of a service oriented architecture that enables the stateless interchange of autonomous messages, including both data and logic.

The independent modeling performed by the system 10 can promote development of new, cost-effective, and low-dilutive capital resources dedicated to more flexible markets. Use of the models verified by the community users of the system 10 in assessing risks and values of a financial instrument or an asset can increase the value of modeled financial instrument or asset because of the reliability of the system 10. Cost of transactions in the marketplace can be reduced based on the enhanced transparency provided by the system 10. Cost from customers' internal modeling and related risk management, and D&O (directors and officers) insurance can also be reduced.

Figure 3A:
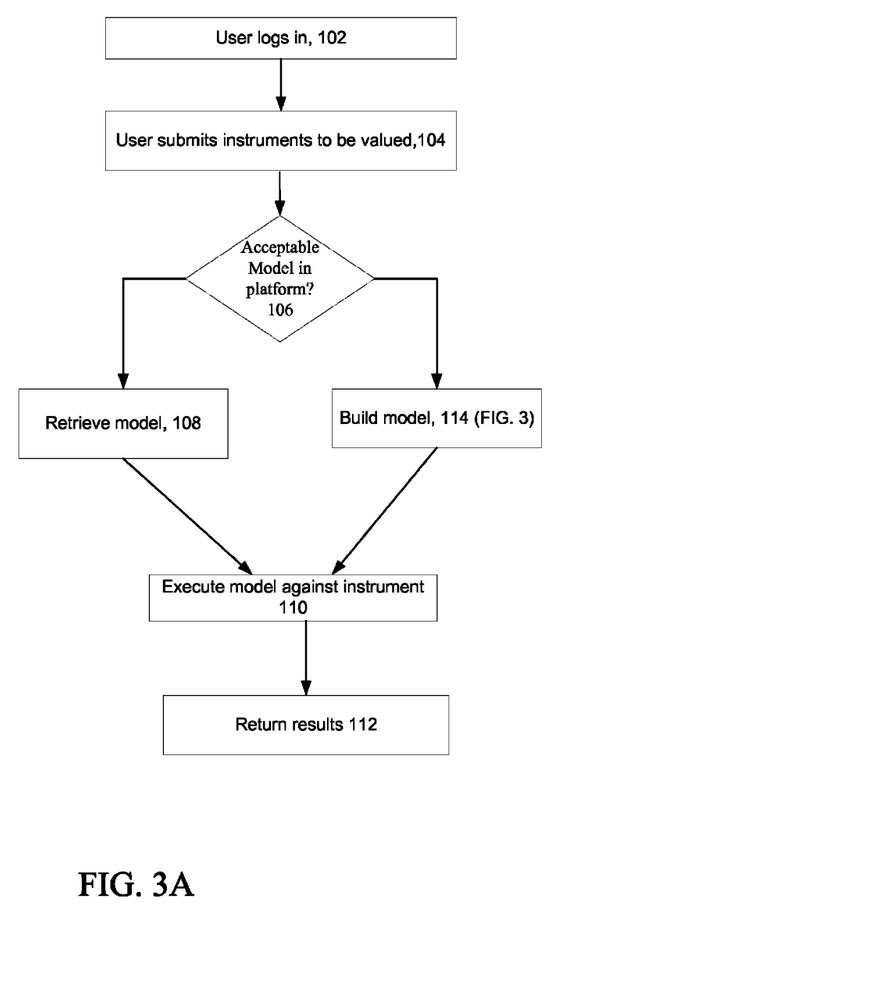
FIG. 3A is a flow diagram of a valuation process.

Referring to FIG. 3A, the dynamic interaction between the customer 14 and the system 10 is shown. The platform 12 allows a customer or other users to log 102 in to the platform 12 through client systems 17. One or more customers may request to join the valuation program run by the system 10. The request can be made by directly accessing the platform 12, e.g., a webpage of the platform 12, or communicating to the system 10 in other ways, such as sending emails.

The system 10 may charge the customers a fee for using the system to assess risks on a yearly or multi-year basis. The fee can be a lump sum or a percentage, e.g., 0.01% to 0.05%, of value of the assets being modeled, depending on the contract or agreement between the customer and the system 10. The fee can also be determined based on the type of financial instrument to be valued. In some implementations, the system can reward some member customers a percentage of the system 10's revenue.

Customers can access the system 10 on an annual subscription read-only basis, and can pay a monthly nominal fee based on usage of the system 10 for individual modeling projects. In one example, the customers may pay a one-off fee for each specific modeling assignment. The fee can be, e.g., the greater of 0.02% of value of assets modeled and $250,000. In some embodiments, the member customers can also be charged based on individual projects.

After authenticating the customer/users, the system 10 receives 104 information and data about instruments to be assessed submitted the customer. For example, the system may receive relevant portion of an FIS portfolio to assess risks associated with the FIS portfolio to assist the customers in making proper investment. Each security in the portfolio can be identified by a number (a Committee on Uniform Security Identification Procedures number or CUSIP number). In some implementations, the system 10 collaborates with the member customers and the community users to determine which CUSIPS will be prioritized for the assessment. Each security has its own CUSIP number if it is domestic, which enables the platform 12 to focus on a particular security. For example, based on CUSIP, the platform 12 can find that a large number of customers may hold the same security. The platform 12 can prioritize valuation of this particular security over securities (CUSIPS) that are held by fewer or no customers.

Additionally, the system 10 can also obtain from the customer data on risk exposures and historic loss performance, e.g., loan portfolios, investment portfolios, credit derivatives, guarantees, loan commitments. After analysing the modelling project requested by the customer, the system 10 may gather and display data. The data can include cash flow information about an instrument extracted from the customer's input and other data. The system 10 then determines whether there are accepted models in the platform for the instrument to be valued. If yes, the system 10 retrieves 108 the accepted model and executes 110 the accepted model against the instrument. Results of the modelling are returned 112 to the customer. In some implementations, as discussed previously, the accepted models can be further perfected before being applied to the instrument, e.g., based on particular features of the instrument.

If the system 10 finds that there is no accepted model in the platform 12, the system builds 114 a model for valuing the instrument. The building process can be as described for FIG. 3. For example, the system 10 mathematically expresses assumptions on algorithms and data correlations from linguistic articulation. The system 10 enables the community users to vet the algorithms, data correlations, and other assumptions related to the modelling project submitted by the customer. Based on the community input, the system 10 stores, finalized models, with or without modifications for the project, to actually stochastically model or deterministically model the risks associated with the instruments being assessed. In some implementations, the modelling steps can also have the community users' participation. The modelled results are subsequently delivered to the customers.

Post-modelling processes can include use of the modelling results. Initially, the modelling results from the modelling are processed to provide information regarding scoring and distribution of credit exposure. In some implementations, the system 10 updates the scoring and distribution when conditions related to the modelled financial instrument change. The scoring and distribution are used to produce mark-to-model pricing and generate mark-to-market pricing, which together provide a numerical understanding of the modelled results and suggest possible funding to cover the difference between the two pricings. Use of the post-modelling processes potentially increases the customer's profit and capital and increases the confidence of the customers in the market. In turn, the models used in valuation are evaluated based on performance of the customers acting on the modelled results to obtain model confidences. Results from the post-modelling can also be delivered to the customers automatically or upon request.

Figure 5:
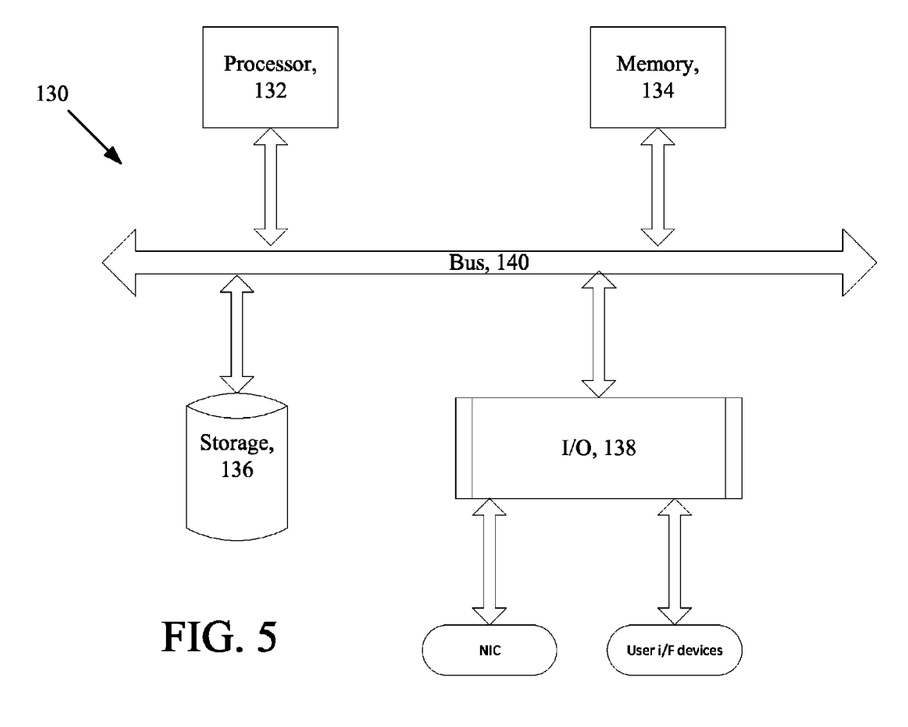
FIG. 5 is a schematic diagram of an example computer system.

FIG. 5 is a diagram of an example computer system 130. The system 130 can be used for practicing operations of the system 10, the platform 12, and/or the one or more computer systems of the platform 12 described above, e.g., the client systems 17. For example, the system 10 can reside and be executed on the computer system 130. The system 130 includes a processor 132, memory 134, one or more storage devices 136, and input/output devices 138. Each of the components 132, 134, 136, and 138 are interconnected using a system bus 140. The processor 132 processes instructions that implement one or more aspects of the systems, components and techniques described above. In some implementations, the processor 132 is a single-threaded processor. In other implementations, the processor 132 is a multi-threaded processor. The processor 132 can include multiple processing cores and is capable of processing instructions stored in the memory 134 or on the storage device 136 to produce information for a user interface that is rendered on a user device (not shown) via the input/output interface 138.

The memory 134 is a computer readable medium such as volatile or non-volatile that stores information within the system 130. The memory 134 can store processes related to the functionality of the valuation system or valuation platform, for example. The storage device 136 is capable of providing persistent storage for the system 130. The storage device 136 can include a floppy disk device, a hard disk device, an optical disk device, or a tape device, or other suitable persistent storage mediums. The storage device 136 can store the various databases described above and can be a local store or a remote store. The input/output interface device 138 provides input/output operations for the system 130. The input/output interface 138 can interconnect a keyboard, a pointing device, and a display unit for displaying graphical user interfaces. The input/output interface 138 also include a network interface card to couple the system 130 to a network.

The computer system shown in FIG. 5 is but one example. In general, embodiments of the subject matter and the functional operations described in this specification can be implemented in digital electronic circuitry, or in computer software, firmware, or hardware. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The invention can be embodied in and/or used with various apparatus, devices, and machines for processing data, including by way of example a programmable processor, a computer, or multiple processors or computers.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment.

Embodiments of the invention can be implemented in a computing system that includes a back end component, e.g., as a data server, or that includes a middleware component, e.g., an application server, or that includes a front end component, e.g., a client computer having a graphical user interface or a web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The system has been described as including clients and servers. A client and server are generally remote from each other and typically interact through a communication network. The relationship of client and server arises by virtue of computer programs running on the respective computers and having a client-server relationship to each other. Other arrangements are possible.

Other embodiments are within the scope of the following claims.

What is claimed is:
1. A machine-based method comprising:
recording, by one or more computers, a first model for use in valuing a financial instrument in a financial market;
publishing by the one or more computers, the first model to systems of a group of users;

receiving by the one or more computers, review information pertaining to the first model, the review information being provided based on review of the published first model by one or more users of the group of users;

recording, at the one or more computers, a second model, the second model being derived from the first model and including modifications to the first model, with the modifications based at least in part on the received review information and associated data, for valuation of the financial instrument; and causing, by the one or more computers, execution of the second model to value the financial instrument.

2. The method of claim 1 wherein causing execution further comprises:

executing the second model by the one or more computers to value the financial instrument.

3. The method of claim 1 further comprising: recording, at the one or more computers, data associated with the financial instrument and the first model.

4. The method of claim 1, wherein valuation of the financial instrument is with respect to at least one of pricing, assessing volatility, and accessing risks associated with the financial instrument.

5. The method of claim 1, further comprising: receiving by a wiki-based computer system inputs from the group of users to produce by the wiki-based computer system the second model.

6. The method of claim 1, further comprising: receiving a request for valuing a financial instrument and valuing the financial instrument based on the second model.

7. The method of claim 6, further comprising: modifying the second model based on the received request and using the modified second model to rate the financial instrument.

8. The method of claim 7, wherein modifying the second model comprises enabling the group of users to access information contained in the received request and to modify the second model.

9. The method of claim 7, further comprising enabling a requester of the request for valuing the financial instrument to review the second model and the modification made to the second model.

10. The method of claim 9, further comprising delivering valuation results of the financial instrument to the requester.

11. The method of claim 10, further comprising delivering information related to the valuation results and the modified second model to previous requesters who requested valuations of financial instruments having features similar to the financial instrument.

12. The method of claim 1, wherein the second model comprises a stochastic model.

13. The method of claim 1, further comprising: recording a set of second models including the second model derived from the first model each model in the set of second models for valuing financial instruments.

14. The method of claim 1, wherein models in the second set of models are categorized into different model types based one or more of description of financial instruments, contracts associated with the financial instruments, interpretation of legal documentation, appropriate structure of cash flows, seniority and subordination of tranches, rights to recoveries, the risk drivers and risk mitigants, and the stochastic properties of the risk drivers.

15. The method of claim 14, further comprising receiving a request for valuing a financial instrument, determining the type of second model to be used for valuing the financial instrument.

16. A computer program product residing on a computer readable medium, the computer program product comprising instructions for causing a processor to:

record, by one or more computers, a first model for use in valuing a financial instrument in a financial market;

publish, by the one or more computers, the first model to systems of a group of users;

receive, by the one or more computers, review information pertaining to the first model, the review information being provided based on review of the published first model by one or more users of the group of users; and record, at the one or more computers, a second model, the second model being derived from the first model and including modifications to the first model, with the modifications based at least in part on the received review information and associated data, for valuation of the financial instrument; and cause, by the one or more computers, execution of the second model to value the financial instrument.

17. The computer program product of claim 16, wherein causing execution comprises executing the second model by the one or more computers to value the financial instrument.

18. The computer program product of claim 16, wherein the instructions cause the processor further to: record, at the one or more computers, data associated with the financial instrument and the first model.

19. The computer program product of claim 16, wherein valuation of the financial instrument is with respect to at least one of pricing, assessing volatility, and accessing risks associated with the financial instrument.

20. The computer program product of claim 16, wherein the instructions cause the processor further to: receive by a wiki-based computer system inputs from the group of users to produce by the wiki-based computer system the second model.

21. The computer program product of claim 16, wherein the instructions cause the processor further to: receive a request for valuing a financial instrument and valuing the financial instrument based on the second model.

22. The computer program product of claim 21, wherein the instructions cause the processor further to: modify the second model based on the received request and using the modified second model to rate the financial instrument.

23. The computer program product of claim 22, wherein modifying the second model comprises enabling the group of users to access information contained in the received request and to modify the second model.

24. The computer program product of claim 22, wherein the instructions cause the processor further to enable a requester of the request for valuing the financial instrument to review the second model and the modification made to the second model.

25. The computer program product of claim 24, wherein the instructions cause the processor further to deliver valuation results of the financial instrument to the requester.

26. The computer program product of claim 25, wherein the instructions cause the processor further to deliver information related to the valuation results and the modified second model to previous requesters who requested valuations of financial instruments having features similar to the financial instrument.

27. The computer program product of claim 16, wherein the second model comprises a stochastic model.

28. The computer program product of claim 16, wherein the instructions cause the processor further to: record a set of second models including the second model derived from the first model each model in the set of second models for valuing financial instruments.

29. The computer program product of claim 16, wherein models in the second set of models are categorized into different model types based one or more of description of financial instruments, contracts associated with the financial instruments, interpretation of legal documentation, appropriate structure of cash flows, seniority and subordination of tranches, rights to recoveries, the risk drivers and risk mitigants, and the stochastic properties of the risk drivers.

30. The computer program product of claim 16, wherein the instructions cause the processor further to receive a request for valuing a financial instrument, determining the type of second model to be used for valuing the financial instrument.

31. A computer system comprising:
a processor;
a memory; and
a storage device that stores a program for execution by the processor using the memory, the program comprising instructions configured to cause the processor to:
record, by one or more computers, a first model for use in valuing a financial instrument in a financial market;
publish, by the one or more computers, the first model to systems of a group of users;
receive, by the one or more computers, review information pertaining to the first model, the review information being provided based on review of the published first model by one or more users of the group of users; and
record, at the one or more computers, a second model, the second model being derived from the first model based at least partially on the received review information and associated data, for valuation of the financial instrument; and
cause, by the one or more computers, execution of the second model to value the financial instrument.

32. The computer system of claim 31, wherein causing execution comprises executing the second model by the one or more computers to value the financial instrument.

33. The computer system of claim 31, wherein the instructions are configured to cause the processor further to: record, at the one or more computers, data associated with the financial instrument and the first model.

34. The computer system of claim 31, wherein valuation of the financial instrument is with respect to at least one of pricing, assessing volatility, and accessing risks associated with the financial instrument.

35. The computer system of claim 31, wherein the instructions are configured to cause the processor further to: receive by a wiki-based computer system inputs from the group of users to produce by the wiki-based computer system the second model.

36. The computer system of claim 16, wherein the instructions are configured to cause the processor further to: receive a request for valuing a financial instrument and valuing the financial instrument based on the second model.

37. The computer system of claim 36, wherein the instructions cause the processor further to: modify the second model based on the received request and using the modified second model to rate the financial instrument.

38. The computer system of claim 37, wherein modifying the second model comprises enabling the group of users to access information contained in the received request and to modify the second model.

39. The computer system of claim 37, wherein the instructions are configured to cause the processor further to enable a requester of the request for valuing the financial instrument to review the second model and the modification made to the second model.

40. The computer system of claim 39, wherein the instructions are configured to cause the processor further to deliver valuation results of the financial instrument to the requester.

41. The computer system of claim 40, wherein the instructions are configured to cause the processor further to deliver information related to the valuation results and the modified second model to previous requesters who requested valuations of financial instruments having features similar to the financial instrument.

42. The computer system of claim 31, wherein the second model comprises a stochastic model.

43. The computer system of claim 31, wherein the instructions are configured to cause the processor further to: record a set of second models including the second model derived from the first model each model in the set of second models for valuing financial instruments.

44. The computer system of claim 31, wherein models in the second set of models are categorized into different model types based one or more of description of financial instruments, contracts associated with the financial instruments, interpretation of legal documentation, appropriate structure of cash flows, seniority and subordination of tranches, rights to recoveries, the risk drivers and risk mitigants, and the stochastic properties of the risk drivers.

45. The computer system of claim 31, wherein the instructions cause the processor further to receive a request for valuing a financial instrument, determining the type of second model to be used for valuing the financial instrument.

46. The method of claim 1 wherein the one or more computers is a first set of one or more computer and causing execution further comprises:
executing the second model by a second, different set of one or more computers that is a different set than the first set of one or more computers to value the-financial instrument.

47. The computer program product of claim 16 wherein the one or more computers is a first set of one or more computer and causing execution further comprises:
executing the second model by a second, different set of one or more computers that is a different set than the first set of one or more computers to value the financial instrument.

48. The computer system of claim 31 wherein the one or more computers is a first set of one or more computer and causing execution further comprises:
executing the second model by a second, different set of one or more computers that is a different set than the first set of one or more computers to value the financial instrument.

* * * * *

UNITED STATES PATENT AND TRADEMARK OFFICE
CERTIFICATE OF CORRECTION

| | | |
|---|---|---|
| PATENT NO. | : 8,566,222 B2 | Page 1 of 1 |
| APPLICATION NO. | : 13/330756 | |
| DATED | : October 22, 2013 | |
| INVENTOR(S) | : Derrell J. Hendrix | |

It is certified that error appears in the above-identified patent and that said Letters Patent is hereby corrected as shown below:

In the Claims

Col. 16, Claim 16, line 11, delete "users; and" and insert --users;--.

Col. 18, Claim 46, line 6, delete "the-financial" and insert --the financial--.

Signed and Sealed this
Twenty-fifth Day of February, 2014

Michelle K. Lee
*Deputy Director of the United States Patent and Trademark Office*